Sept. 30, 1958  H. A. MAGNUS  2,853,975
ACTUATOR FOR UNLOCKING AND REMOVING AIRCRAFT CANOPY
Filed Aug. 2, 1956  2 Sheets-Sheet 1

INVENTOR.
HERBERT A. MAGNUS
BY
W. E. Thibodeau, A. W. Dew & H. I. Forman
ATTORNEYS Sept. 30, 1958  H. A. MAGNUS  2,853,975
ACTUATOR FOR UNLOCKING AND REMOVING AIRCRAFT CANOPY
Filed Aug. 2, 1956  2 Sheets-Sheet 2

INVENTOR.
HERBERT A. MAGNUS
BY
*W. E. Thibodeau, A. W. Dew & H. I. Forman*
ATTORNEYS

United States Patent Office 2,853,975
Patented Sept. 30, 1958

2,853,975

ACTUATOR FOR UNLOCKING AND REMOVING AIRCRAFT CANOPY

Herbert A. Magnus, Huntsville, Ala., assignor to the United States of America as represented by the Secretary of the Army Application August 2, 1956, Serial No. 601,850

4 Claims. (Cl. 121—40)

(Granted under Title 35, U. S. Code (1952), sec. 266)

The invention described herein may be manufactured and used by or for the Government for governmental purposes without payment of any royalty thereon.

This invention relates to an actuator for unlocking an aircraft canopy and then supplying fluid pressure for its removal. An object is to make the removal of a canopy safer and more nearly foolproof so that it will be automatically unlocked before an effort is made to remove it.

In aircraft having seat ejectors, it is sometimes necessary to unlock a canopy before removing it. When two operations are necessary, a pilot in times of stress may overlook the unlocking operation thereby preventing the removal of the canopy. According to this invention, a single operation performs both the unlocking and controls in sequence the operation of a fluid pressure actuator.

Referring to the drawing.

Figure 1:
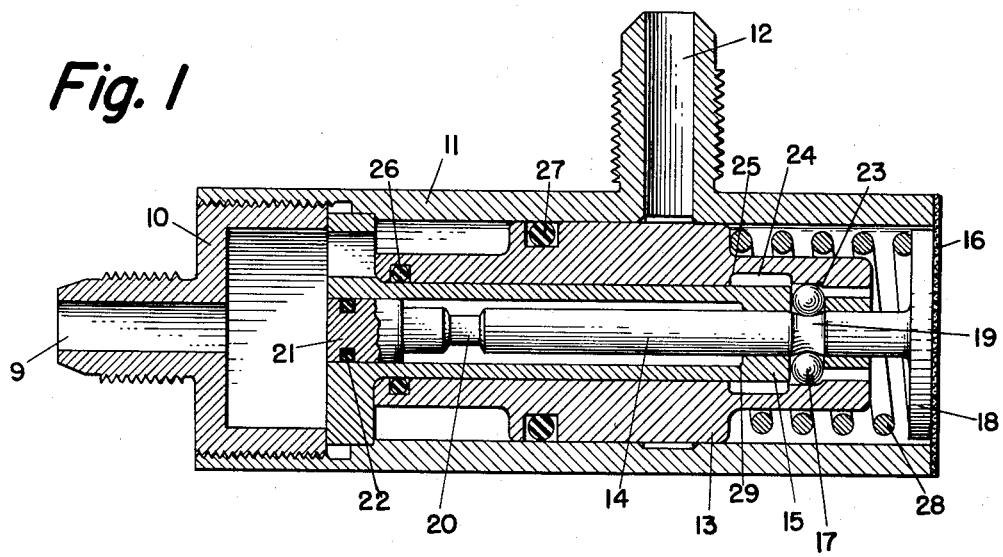
Fig. 1 is a longitudinal section through a preferred embodiment of the invention in its initial position.
Figure 3:
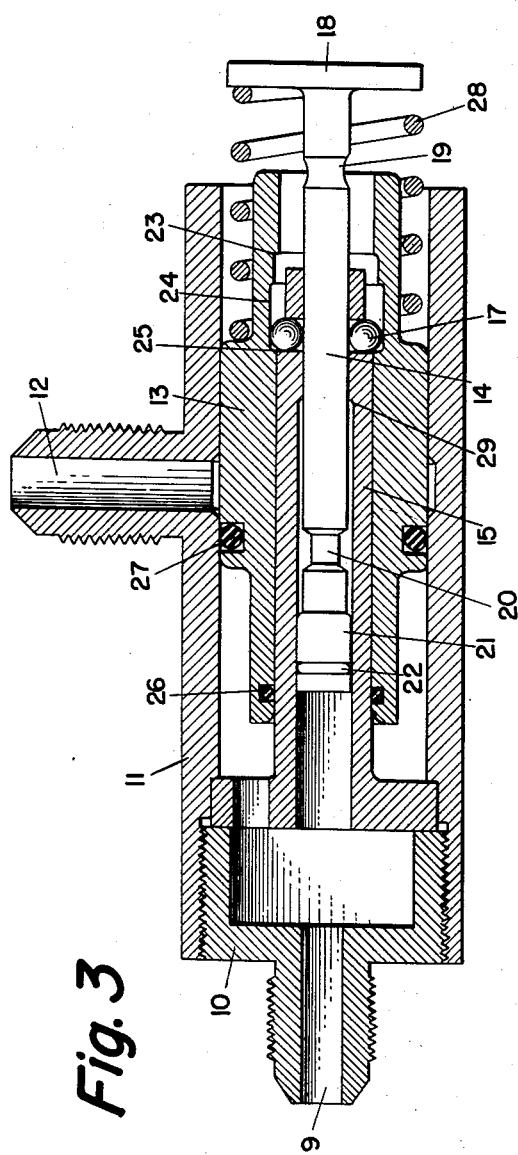
Fig. 3 is a longitudinal section through the embodiment of Fig. 1 but with the outer piston in a stopped position while the inner piston is moving outwardly.
Figure 4:
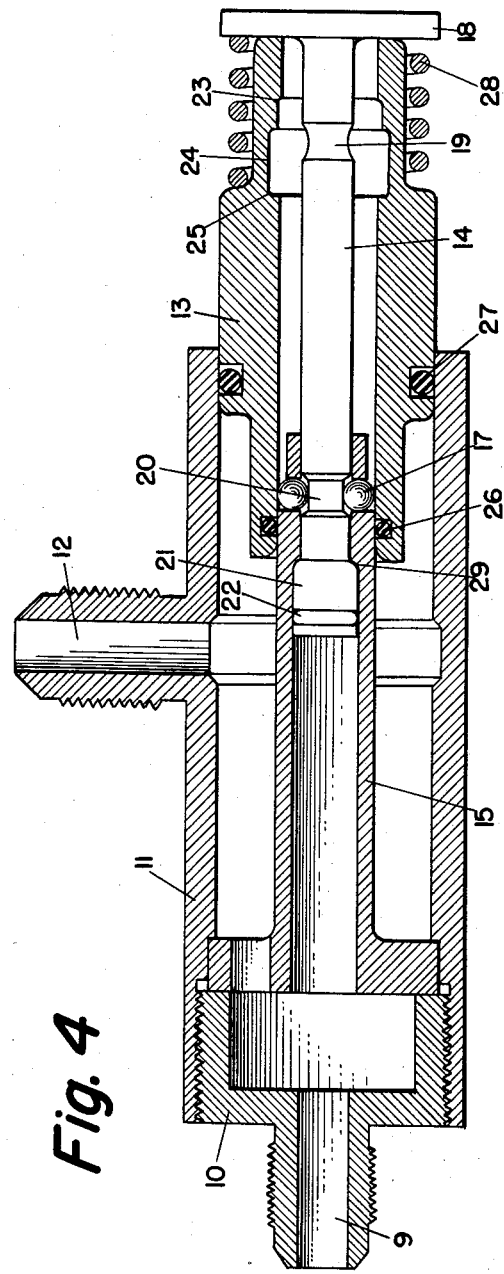
Fig. 4 is the final position in which both pistons are stopped and in which fluid pressure is being supplied to the canopy actuator (not shown).

A threaded connector 9 leads to a source of gas under pressure such as that from a cartridge. Integral with the connector is the cap 10 provided with threads on its surface for cooperation with the outer casing 11. A passageway 12 leads to a canopy remover, not shown. Within the casing 11, is an outer piston 13 and an inner piston 14 and between these pistons is a stationary sleeve 15 having an enlarged left end which is clamped between the casing and cap as illustrated in Fig. 1. The right end of the outer casing is provided with a diaphragm seal of plastic material such as shellac or other suitable hermetic seal 16. The sleeve 15 constitutes a guide surface on which the outer piston slides and within which the inner piston moves. One or more balls 17 are carried by the sleeve 15 for purposes of limiting movement of the two pistons. These balls are preferably three in number. At the right end of the inner piston is an enlarged head 18 constituting a stop for the outer piston and its spring and also an abutment against which power is applied for unlocking the canopy. At the right end of the inner piston the balls 17 are shown as engaged within a groove 19 before the application of fluid pressure to the connector 9. The coil spring illustrated presses the outer piston to the left until its left end engages the enlarged end of the sleeve 15. Adjacent to the left end of the inner piston is a recess or groove 20 for purposes to be described hereinafter. The left end of the inner piston of Fig. 1 is enlarged at 21 and provided with an O ring packing 22 so that as the piston slides within the sleeve the packing prevents loss of fluid pressure. Instead of the left end of the outer piston of Fig. 1 engaging the enlarged end of the sleeve, an abutment 23 at the right end of the outer piston may engage the balls 17 to limit movement to the left under the influence of the coil spring. A groove 24 of larger diameter within the outer piston provides space into which balls 17 may be moved after coming out of the groove 19 in the inner piston. An abutment wall 25 is provided on the inner surface of the outer piston for the purpose of limiting outward travel of the outer piston as is shown in Fig. 3. O packing rings 26 and 27 are provided in the outer piston to prevent leakage of fluid pressure between the outer piston and the outer casing and also between the outer piston and the sleeve. The spring 28 is what urges the outer piston to the left. An abutment wall 29 in the sleeve limits outward movement of the inner piston as shown in Fig. 4.

Figure 2:
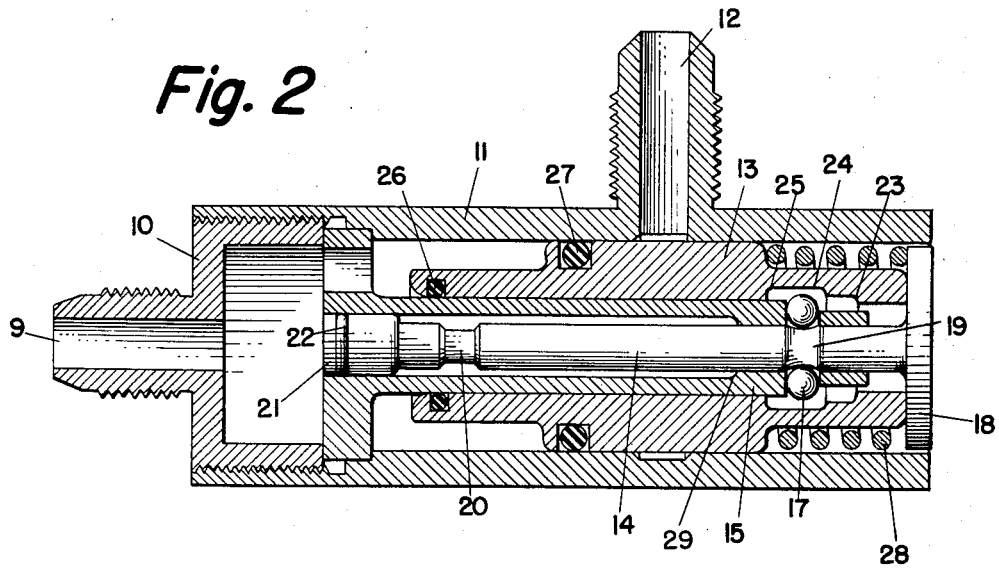
Fig. 2 is a longitudinal section through the device of Fig. 1 but with the elements in their position immediately after the seal has been broken.

In operation, the application of fluid pressure to the connector 9 applies pressure to the outer piston which compresses the spring and moves the outer piston to a position such as shown in Fig. 2 in which the seal has been broken by the impingement of the outer piston upon the enlarged head 18 of the inner piston and shearing of the seal 16. The area of the inner piston is not sufficient of itself to cause the shearing of the seal 16 and it is the force of the impact of the outer piston upon the enlarged head 18 in addition to the fluid pressure on the inner piston which effects the rupture of the seal. As soon as the seal is broken the inner piston moves to the right causing the balls 17 to be moved out of their groove 19 into the space within the groove 24, in the outer piston. Since the sleeve is fixed it will be noted that the outer piston moves only to the position shown in Fig. 3 in which the abutment wall 25 engages the ball 17 and precludes further movement of the outer piston to the right. The inner piston continues its outward movement to the right until it reaches the position shown in Fig. 4 when the balls 17 fall into the groove 20 of the inner piston enabling the outer piston to continue movement to the right. Movement of the inner piston to the right is stopped by the abutment wall 29 which is engaged by the enlarged end 21 of the inner piston. When the inner piston has reached its outermost position as shown in Fig. 4, the canopy will have been unlocked by the power applied to the enlarged head 18. As soon as the inner piston reaches its extreme position, the outer piston will be moved to the right in order to uncover the passageway 12 and enable fluid pressure to be moved out through the passageway 12 for actuation of the canopy remover (not shown).

Among the advantages of this invention may be mentioned the fact that the removal of the canopy is made safer, more nearly foolproof, and the unlocking of the canopy is made substantially automatic upon firing of the actuator. The device illustrated has been embodied in a satisfactory specimen about 12" long by about 2" in diameter having a 1⅜" stroke for the inner piston. There is no noticeable period of dwell between the positions for the pistons in the several figures of the drawings.

I claim:

1. A fluid pressure responsive mechanism including inner and outer cylinders having a fluid inlet at one of their ends, said outer cylinder having a fluid outlet intermediate its ends, an outer piston movable between said cylinders to close and open said outlet, an inner piston movable within said inner cylinder, means tending to move said inner piston with respect to said outer cylinder, and means for locking said pistons together, said locking means being operable to unlock said pistons in response to a predetermined limited movement of said outer piston with respect to said inner piston.

2. A fluid pressure responsive mechanism including inner and outer cylinders having a fluid inlet at one of their ends, said outer cylinder having a fluid outlet intermediate its ends, an outer piston movable between said cylinders to close and open said outlet, an inner piston movable within said inner cylinder, means tending to move said inner piston with respect to said outer cylinder, and means for locking said pistons together, said locking means being operable to unlock said pistons in response to a predetermined limited movement of said outer piston with respect to said inner piston, said inner piston being formed to cooperate with said locking means for locking said pistons in their extended position.

3. In a fluid pressure responsive mechanism, the combination of inner and outer cylinders having a fluid inlet at one of their ends, said outer cylinder having a seal at its opposite end and a fluid outlet intermediate its ends, an outer piston movable between said cylinders to cover and uncover said outlet, an inner piston movable within said inner cylinder and arranged to engage said seal, means tending to drive said inner piston through said seal, and means for locking said pistons together, said locking means being operable to unlock said pistons in response to a predetermined limited movement of said outer piston.

4. A fluid pressure responsive mechanism including inner and outer cylinders having a fluid inlet at one of their ends, said outer cylinder having a fluid outlet intermediate its ends, an outer piston of relatively large cross sectional area movable between said cylinders to close and open said outlet, an inner piston of relatively small cross sectional area movable within said inner cylinder, means tending to move said inner piston with respect to said outer cylinder, and means for locking said pistons together, said locking means being operable to unlock said pistons in response to a predetermined limited movement of said outer piston with respect to said inner piston.

References Cited in the file of this patent

UNITED STATES PATENTS

| 2,196,946 | Stone | Apr. 9, 1940 |
| 2,343,495 | Campbell | Mar. 7, 1944 |

FOREIGN PATENTS

| 593,000 | Great Britain | Oct. 6, 1947 |